(12) United States Patent
Wilson

(10) Patent No.: US 12,270,640 B2
(45) Date of Patent: Apr. 8, 2025

(54) MOTOR VEHICLE CHASSIS SENSOR WITH OVERMOLDED AND ENCAPSULATED MAGNET

(71) Applicant: CTS Corporation, Lisle, IL (US)

(72) Inventor: Jess D. Wilson, Glen Ellyn, IL (US)

(73) Assignee: CTS Corporation, Lisle, IL (US)

( * ) Notice: Subject to any disclaimer, the term of this patent is extended or adjusted under 35 U.S.C. 154(b) by 427 days.

(21) Appl. No.: 17/814,074

(22) Filed: Jul. 21, 2022

(65) Prior Publication Data

US 2023/0028396 A1 Jan. 26, 2023

Related U.S. Application Data

(60) Provisional application No. 63/224,188, filed on Jul. 21, 2021.

(51) Int. Cl.
*G01B 7/02* (2006.01)
*B29C 39/10* (2006.01)
*B29K 705/00* (2006.01)
*B60G 17/019* (2006.01)
*G01D 5/14* (2006.01)
*G01D 11/24* (2006.01)
*G01M 17/04* (2006.01)

(52) U.S. Cl.
CPC .............. *G01B 7/02* (2013.01); *G01D 5/145* (2013.01); *G01D 11/245* (2013.01); *G01M 17/04* (2013.01); *B29C 39/10* (2013.01); *B29K 2705/00* (2013.01); *B60G 17/019* (2013.01); *B60G 2204/11* (2013.01)

(58) Field of Classification Search
None
See application file for complete search history.

(56) References Cited

U.S. PATENT DOCUMENTS

| | | |
|---|---|---|
| 9,134,200 B2 | 9/2015 | Waite et al. |
| 10,288,529 B2 | 5/2019 | Waite et al. |
| 2006/0274485 A1 | 12/2006 | Godoy et al. |
| 2010/0078253 A1* | 4/2010 | Rolfe ............... B60L 8/003 454/143 |
| 2017/0276511 A1 | 9/2017 | Kotlaja et al. |

FOREIGN PATENT DOCUMENTS

| | | |
|---|---|---|
| DE | 102016217814 A1 | 3/2018 |
| WO | 2020260141 A1 | 12/2020 |

OTHER PUBLICATIONS

International Search Report and Written Opinion for Application No. PCT/US2022/074001 dated Oct. 11, 2022 (14 pages).

* cited by examiner

*Primary Examiner* — Farhana A Hoque
(74) *Attorney, Agent, or Firm* — Michael Best & Friedrich LLP

(57) ABSTRACT

A vehicle chassis sensor assembly for measuring the ride height of a vehicle which comprises a rotary arm member including an overmolded magnet encapsulated in the rotary arm member. In one embodiment, the overmolded magnet includes a layer of overmold material defining an open overmold window in the side and/or top exterior surfaces of the layer of overmold material. Another embodiment includes a pair of spaced magnets that are completely encapsulated in a two step molding process before being molded into a rotary arm member.

18 Claims, 4 Drawing Sheets

MOTOR VEHICLE CHASSIS SENSOR WITH OVERMOLDED AND ENCAPSULATED MAGNET

CROSS-REFERENCE TO RELATED APPLICATIONS

This application claims priority to U.S. provisional application No. 63/224,188 filed Jul. 21, 2021 and titled "Motor Vehicle Chassis Sensor with Overmolded and Encapsulated Magnet," which is hereby incorporated by reference in its entirety.

FIELD

This invention relates to a motor vehicle chassis sensor and particularly to a motor vehicle chassis sensor with an overmolded and encapsulated magnet.

BACKGROUND

Modern motor vehicles employ numerous types of sensors and sensor assemblies throughout the vehicle which are used in control systems for powertrain, chassis, interior cabin environment, and safety, among many other applications. One type of sensor is used for detecting the ride height position of the vehicle. This is a measure of the position of sprung chassis or body components relative to unsprung chassis components such as axles, steering knuckles, and axle hubs (also referred to as jounce motion).

Such sensors are used in a variety of applications. For example, some vehicles have headlights systems which adapt to various loading conditions to maintain their desired aiming point over a variety of vehicle loads. In such applications, a ride height sensor indicating the position of a front and rear wheel component is processed to set the aiming point. Another application is for actively controlled suspension components such as shock absorbers and springs which are dynamically adjusted based on wheel motion inputs. Adjustments of spring preloading for rear axles is also accomplished using data from a ride height sensor used to inflate air bladders or other suspension components to adapt to different loading conditions.

Many designs of ride height sensors are presently known, including the designs disclosed in U.S. Pat. Nos. 9,134,200 and 10,288,529, both of which are assigned to CTS Corporation, and the disclosures of which are incorporated by reference herein.

Current ride height sensors include a magnet adapted for cooperation with a sensor such as for example a Hall effect sensor for sensing and measuring the ride height of the vehicle. There is a need for an improved magnet design for protecting the magnet from the hostile exterior vehicle environment of moisture, salt, dirt, physical damage, and extreme temperatures.

The present embodiments are directed to a magnet which is overmolded in a first manufacturing process and then encapsulated into the plastic of the ride height sensor in a second manufacturing process for providing a ride height sensor with a magnet protected from the hostile exterior vehicle environment of moisture, salt, dirt, physical damage, and extreme temperatures.

SUMMARY

The present arrangements are generally directed to a vehicle chassis sensor assembly for measuring the ride height of a vehicle and comprising a rotary arm member including an overmolded magnet encapsulated in the rotary arm member.

In one embodiment, the overmolded magnet includes a layer of overmold material defining an open overmold window.

In one embodiment, the open overmold window is located in a side surface of the layer of overmold material of the overmold magnet.

In one embodiment, the open overmold window in the side surface of the layer of overmold material of the overmold magnet is rectangular in shape.

In one embodiment, the open overmold window is located in a top surface of the layer of overmold material of the overmold magnet.

In one embodiment, the open overmold window located in the top surface of the layer of overmold material of the overmold magnet is circular in shape.

The present invention is also directed to a method of making a vehicle chassis sensor assembly for measuring the ride height and comprising a rotary arm member, the method comprising the steps of providing a magnet, overmolding the magnet to create an overmolded magnet with a layer of overmold material, and encapsulating the overmolded magnet into the rotary arm member.

In one embodiment, the method further comprises the step of forming a window in the layer of overmold material of the overmold magnet.

In one embodiment, the window is formed in a side surface of the layer of overmold material.

In one embodiment, the window is rectangular in shape.

In one embodiment, the window is formed in a top surface of the layer of overmold material.

In one embodiment, the window is circular in shape.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION

Figure 1:
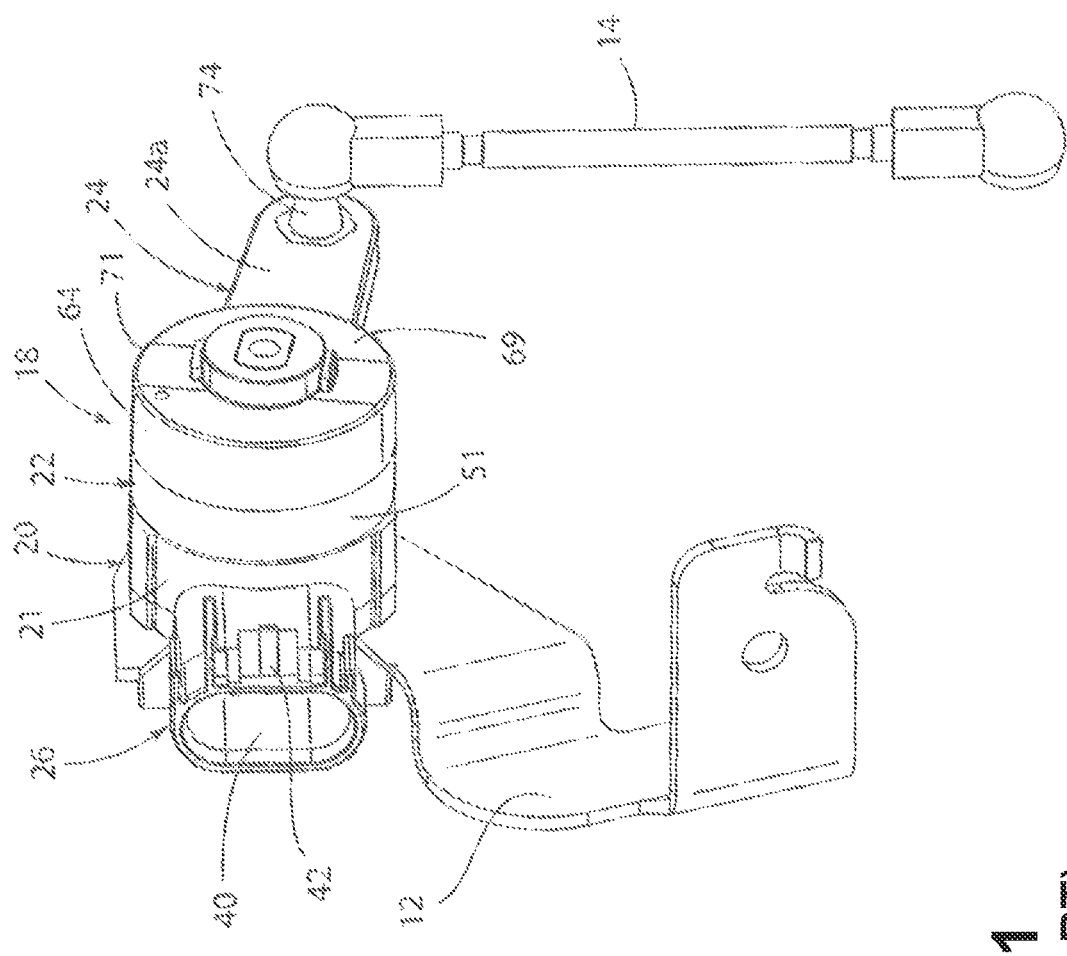
FIG. 1 is a perspective view of a prior art motor vehicle chassis sensor assembly for measuring ride height position with vehicle chassis mounting and linkage components coupled thereto.
Figure 2:
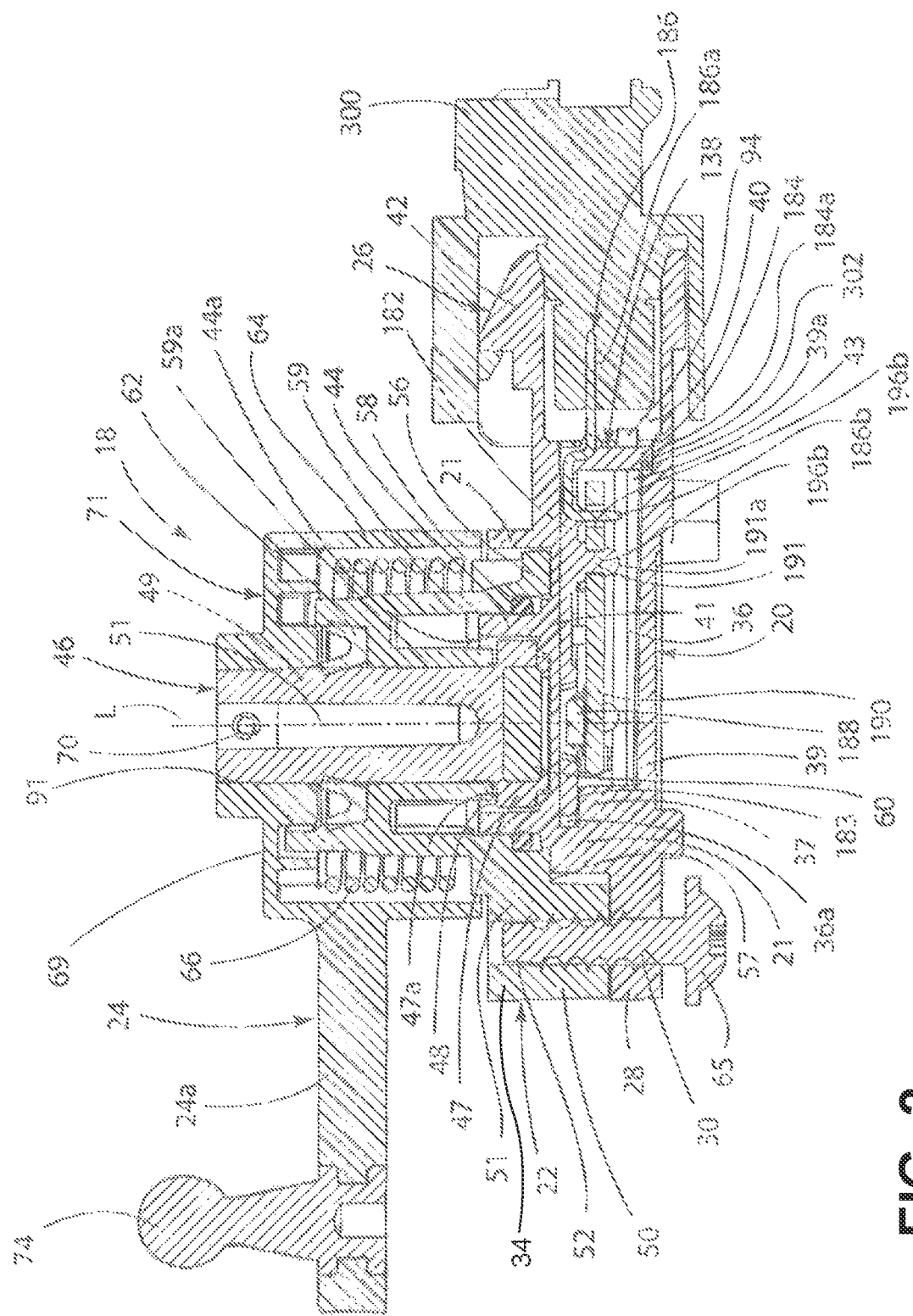
FIG. 2 is a partially exploded perspective view of the prior art vehicle chassis sensor assembly depicted in FIG. 1.

FIGS. 1 and 2 depict a prior art rotary position sensor assembly which, in the embodiment shown, is in the form of a motor vehicle chassis sensor assembly 18 for measuring and determining the ride height position of a vehicle.

As shown in FIG. 1, the sensor assembly 18 is fixed to a metal chassis bracket 12 which is coupled to a motor vehicle frame or body component (not shown) which is sprung by the vehicle suspension system (not shown). Linkage 14 couples a rotary arm member 24 of the sensor assembly 18 to an unsprung component of the vehicle's chassis such as, for example, a rear axle, a steering knuckle, a hub component, or such other component which moves with the road engaging wheels and tires (which are unsprung chassis components). Relative motion (jounce) between the sprung and unsprung components of the vehicle chassis cause the rotary motion of the rotary arm member 24. This rotary motion is sensed by a sensor element and is converted into electrical signals used for various control functions, some of which are generally described previously.

The sensor assembly 18 is illustrated in FIG. 2 which shows the primary components, members, and elements of the sensor assembly 18 including the following members or components which can all be made of a suitable plastic material: a stationary lower housing or first housing member 20 that houses a sensor cartridge assembly 138 in the interior of a cartridge slot 36, an upper housing or second housing member or sleeve 22 that guides and retains a rotatable shaft 46, a rotary arm or rotatable arm member 24 that is coupled to the shaft 46 that rotates the shaft 46 in response to the rotation of the arm member 24, and an electrical terminal connector housing 26 that is unitary with the first housing member 20 and is adapted to receive an electrical connector 300.

Housing member 20 which, in the embodiment shown, is generally in the form of a ring or cylinder, includes an outer wall 21 that incorporates exterior mounting and location features including an exterior fastener boss or bracket 28 defining an interior threaded fastener aperture 30, and a pair of exterior locating bosses or ears 34 that are located in a diametrically opposed relationship to the bracket 28. Fastener bracket 28 along with locating bosses 34 are received by respective mating surfaces and apertures (not shown) formed by the chassis bracket 12 to provide a secure and accurate mounting and location of the sensor assembly 18 to the chassis bracket 12.

As shown, the housing member 20 forms and defines an interior sensor cartridge slot or cavity 36 that receives and houses a sensor cartridge assembly 138 as described in more detail below. The cartridge slot 36 is defined and bounded by the combination of the interior surface of a base horizontal wall 39 of the housing member 20; the interior surface of a top horizontal wall 41 of the housing member 20 that is located opposite, spaced from, and parallel to, the base wall 39; and the interior surface of the vertical wall 21 of the housing member 20 extending between and unitary with the ends of, and in a relationship generally normal to, the base wall 39 and the top wall 41.

The cartridge slot 36 is in communication with the interior of the connector socket 40 of the connector housing 26 via an opening 43 defined by the housing member 20 and located between the cartridge slot 36 and the interior of the connector socket 40. In the embodiment shown in FIG. 2, the connector housing 26 is unitary with, and protrudes outwardly from, the exterior surface of the wall 21 of the housing member 20. Electrical connector socket 40 is adapted to receive an electrical connector 300 which includes elements of known configuration. Open connector socket 40 also is provided with connector locking features including a tang 42 for providing positive locking of the electrical connector 300 at its installed position to the connector housing 26 and inside the connector socket 40.

The shaft 46 is in the form of an elongate open tube that includes a solid base 47 having a pill-shaped magnet 60 molded into the plastic material of the base 47 and a cylindrical wall 49 that extends and protrudes upwardly and outwardly from the top of the base 47 and defines an open tubular interior or sleeve 51.

Shaft 46 is an annular bobbin or mandrel shaped member which provides for mounting and rotary movement of the magnet 60. Rotary motion of shaft 46 relative to the cartridge slot 36, and more specifically relative to the hall effect sensor 188 thereon, causes a change in the magnetic field lines sensed by the hall effect sensor 188 which generates an angle signal (i.e., a signal proportional to angle).

Figure 3:
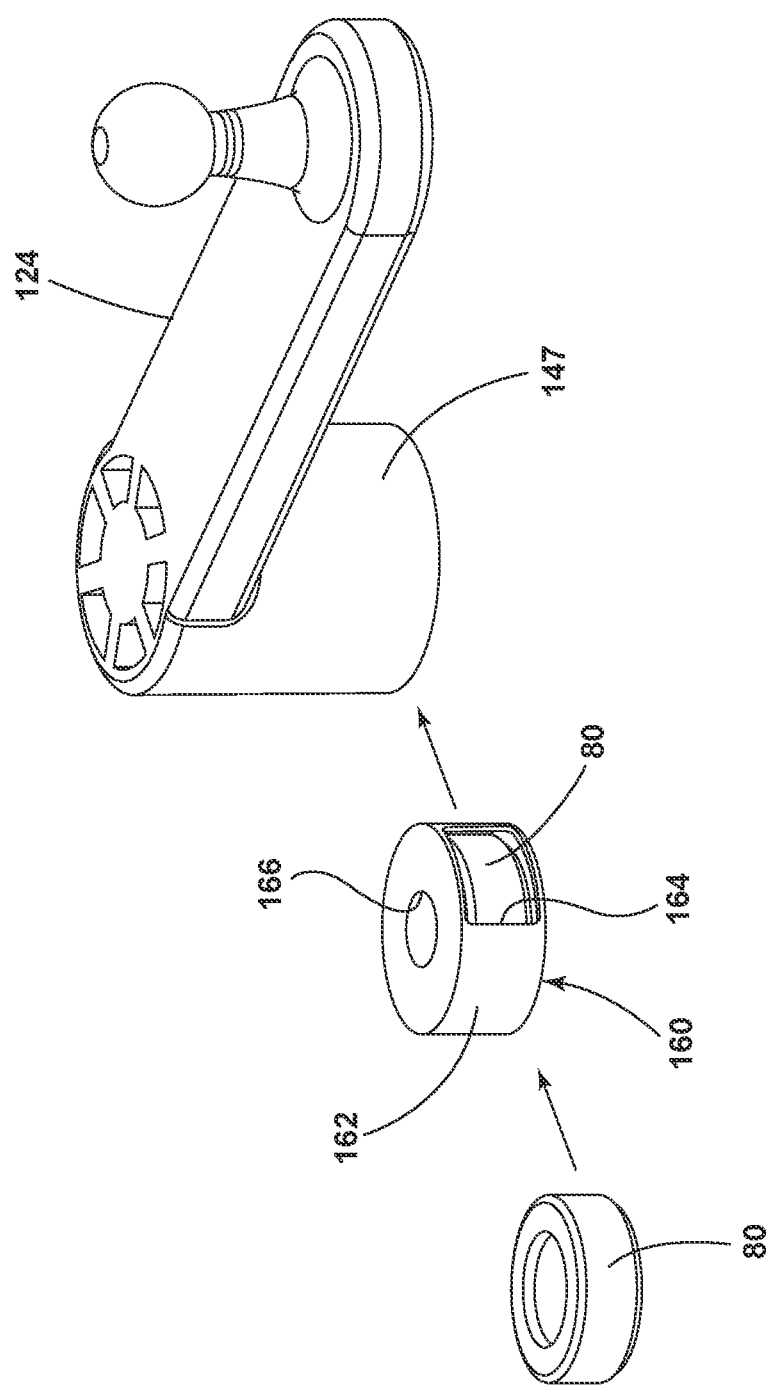
FIG. 3 is a perspective view depicting a sensor magnet and further depicting the process for overmolding and encapsulating the magnet into the rotary arm member of the motor vehicle chassis sensor assembly.

As shown in FIG. 3, one embodiment is directed to a new and improved design for the magnet 60 of the prior art motor vehicle chassis sensor assembly 18 depicted in FIGS. 1 and 2. In FIG. 3, the magnet 80 is subjected to a first overmold process or operation during the manufacture of the motor vehicle chassis sensor assembly 18 to create and form an overmolded magnet 160 including an exterior layer 162 of a suitable overmold material such as a plastic or elastomeric material.

In the embodiment shown in FIG. 3, the exterior overmold layer 162 includes and defines respective overmold through openings or windows 164 and 166 in the respective side and top exterior surfaces of the exterior overmold layer 162. In the embodiment, the side opening or window 164 is generally rectangular in shape and the top opening or window 166 is generally circular in shape.

In accordance with the embodiment, the overmolded magnet 160 is then subsequently, in a second process or operation during the manufacture of the motor vehicle chassis sensor assembly, encapsulated into the plastic material of the base 147 of the rotary arm member 124.

In conclusion, the FIG. 3 embodiment is directed to a method of making a vehicle chassis sensor assembly for measuring the ride height and comprising a rotary arm member 124, the method comprising the steps of:

Providing a magnet 80; overmolding the magnet to create an overmolded magnet with a layer of overmold material; and encapsulating the overmolded magnet into the rotary arm member.

In one embodiment, the method further comprises the step of forming a window in the layer 162 of overmold material of the overmolded magnet 160. In another embodiment, a window 164 is formed in a side surface of the layer of overmold material. In one embodiment, a window 166 is formed in a top surface of the layer of overmold material. In another embodiment, the window 166 is circular in shape to define an aperture.

Thus, the FIG. 3 embodiment is directed to a motor vehicle chassis sensor assembly comprising a rotary arm member 124 including an overmolded magnet 160 encapsulated into the plastic or elastomeric material of the rotary arm member 124 for the purpose of protecting the overmolded magnet 160 from exposure to a hostile exterior vehicle environment of moisture, salt, dirt, physical damage, and extreme temperatures.

Figure 4:
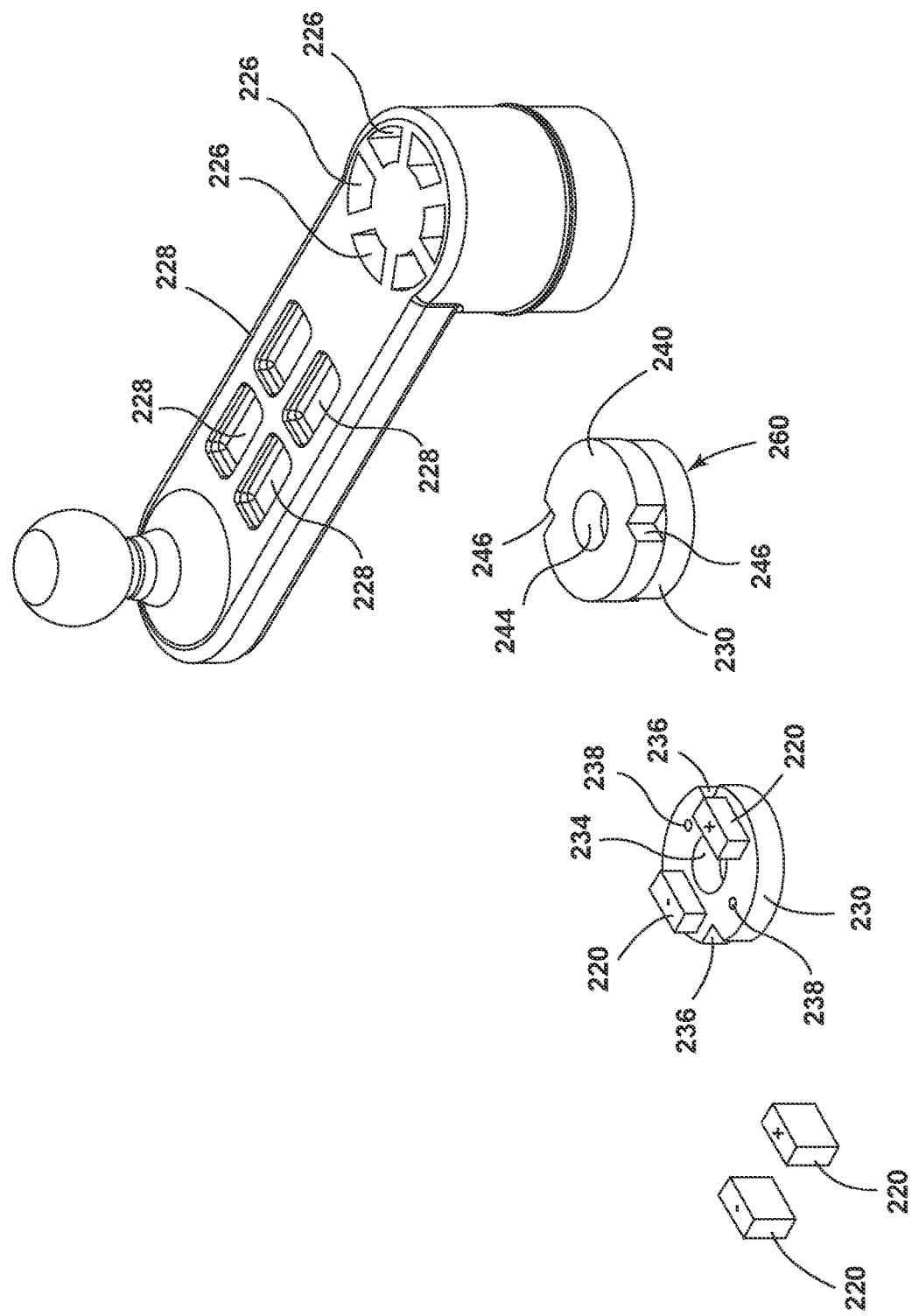
FIG. 4 is a perspective view of another sensor magnet and further depicting the process for overmolding and encapsulating the magnet into the rotary arm member of a motor vehicle chassis sensor assembly.

FIG. 4 shows another embodiment of a rotary arm member 224 including an overmolded magnet arrangement 260. In one embodiment, the overmolded magnet arrangement 260 has a cylindrical shape. The embodiment includes a pair of magnets 220. In one embodiment, the magnets 220 have a rectangular shape. Other shapes and numbers of magnets are contemplated.

Initially a method of making a vehicle chassis sensor assembly having a rotary arm member includes disposing the magnets 220 at spaced positions within a first mold. In operation, filling the first mold with a resin is provided to form a base mount 230 encapsulating a portion of the magnets 220 with a remaining portion of the magnets projecting outwardly therefrom. Thus, filling the resin into the first mold results in the magnets 220 being partially within the molded material and partially exposed. The resin forms the base mount 230 supporting the magnets 220. The base mount 230 includes a central aperture or window 234 defining an opening. In one embodiment, the base mount 230 has a cylindrical disc shape with a pair of inwardly oriented spaced notches 236 essentially equidistant about the periphery thereof as shown in FIG. 4. In one embodiment, the base mount 230 includes a pair of interlocking cavities 238 that are vertically oriented and spaced equidistantly about the cylindrical base mount 230. The pair of magnets 220 are disposed in spaced apart positions equidistant from the interlocking cavities 238. Thus, the first molding operation results in partially encapsulated magnets 220 provided with the base mount 230.

Thereafter, the method includes disposing the base mount 230 and magnets 220 in a second mold. Filling of the second mold with a resin forms an enclosing mount 240 that encapsulates the remaining portion of the magnets 220 that is exposed, so that the magnets are entirely encapsulated to form an overmolded magnet arrangement 260. Thus, the enclosing mount 240 is formed onto the base mount 230 to encapsulate the magnets 220. In one embodiment, the enclosing mount 240 has a cylindrical disc shape and includes a central aperture or central window 244 similar to the central aperture or window of the base mount 230. Further, the enclosing mount 240 includes a pair of spaced notches 246 essentially equidistant about the periphery thereof as shown in FIG. 4. The interlocking cavities 238 also receive resin to provide stability between the base mount 230 and the enclosing mount 240. The combination of the base mount 230 and the enclosing mount 240 entirely encapsulate the magnets 220 to protect the magnets from the elements. The base mount 230 and the enclosing mount 240 include overmold material from the resin forming a layer encompassing the magnets 220.

Further, unlike other magnets for measuring ride height, the magnets 220 shown in FIG. 4 are not coated with a Parylene protective coating. Instead, the magnets 220 are now completely encased in the overmolded magnet arrangement 260 and do not require, and thus are free from a Parylene protective outer coating. Instead, a less expensive epoxy protective outer coating is provided for the magnets 220.

In one embodiment, the resin is polybutylene terephthalate (PBT) resin. Other resins are contemplated.

In one embodiment, the central apertures 234, 244 extend through the entirety of the overmolded magnet arrangement 260 formed by the mounts 230, 240 enclosing the magnets 220.

Thereafter, the overmolded magnet arrangement 260 is disposed into a rotary arm member mold for forming a rotary arm member. The method includes filling the rotary arm member mold to encapsulate the overmolded magnet arrangement 260 in an end of a rotary arm member 224 formed by the mold. More specifically, the overmolded magnet arrangement 260 is encapsulated into the plastic or elastomeric material of the rotary arm member 224 for the purpose of additionally protecting the overmolded magnet arrangement 260 from exposure to a hostile exterior vehicle environment of moisture, salt, dirt, physical damage, and extreme temperatures. Thus, the magnets 220 are encapsulated twice. In one embodiment, the rotary arm member 224 includes windows 226 at an end near the encapsulated overmolded magnet arrangement 260, and windows 228 along a length thereof. Thus, the overmolded magnet arrangement 260 includes a central window 244 that is circular in shape to define an aperture extending from a flat end into the overmolded magnet arrangement 260.

The rotary arm member 224 operates in similar manner to the rotary arm set forth in U.S. Pat. No. 9,134,200, incorporated by reference herein. A hall effect sensor or other element detects the position of the magnets to determine ride height and other effects.

In one embodiment, the vehicle chassis sensor assembly is free from an O-ring or seal to protect the pair of spaced magnets encapsulated in the rotary arm member as the complete encapsulation of the magnets 220 requires less protection from the elements.

The first and second magnets 220 are typically molded and encapsulated simultaneously. Additional magnets are contemplated. Various shapes for the magnets 220 are also contemplated.

While the above description constitutes the preferred embodiment of the present invention, it will be appreciated that the invention is susceptible to modification, variation and change without departing from the proper scope and fair meaning of the accompanying claims.

I claim:

1. A vehicle chassis sensor assembly for measuring ride height of a vehicle and comprising a rotary arm member including an overmolded magnet encapsulated in the rotary arm member,
   wherein the overmolded magnet includes a layer of overmold material defining an open overmold window, and
   wherein the open overmold window is located in a side surface of the layer of overmold material.

2. The vehicle chassis sensor assembly of claim 1 wherein open overmold window is rectangular in shape.

3. The vehicle chassis sensor assembly of claim 1 wherein another open overmold window is located in a top surface of the layer of overmold material.

4. The vehicle chassis sensor assembly of claim 3 wherein the another open overmold window is circular in shape.

5. A method of making a vehicle chassis sensor assembly for measuring ride height of a vehicle and comprising a rotary arm member, the method comprising the steps of:
   disposing a magnet in a first mold;
   filling the first mold with a resin that forms a base mount encapsulating a portion of the magnet with a remaining portion of the magnet projecting outwardly therefrom;
   disposing the base mount supporting the magnet in a second mold;
   filling the second mold with a resin that forms an enclosing mount that encapsulates the remaining portion of the magnet so that the magnet is entirely encapsulated to form an overmolded magnet arrangement;
   disposing the overmolded magnet arrangement into a rotary arm member mold; and
   filling the rotary arm member mold with a resin to encapsulate the overmolded magnet arrangement into the rotary arm member.

6. The method of claim 5, wherein the magnet is a first magnet, the method including providing a second magnet, the method including:
   disposing the second magnet in the first mold;
   filling the first mold with the resin that forms the base mount encapsulating a portion of the second magnet with a remaining portion of the second magnet projecting outwardly therefrom;
   disposing the base mount and the second magnet in a second mold; and filling the second mold with the resin that forms the enclosing mount so that the remaining portion of the second magnet is entirely encapsulated to form the overmolded magnet arrangement.

7. The method according to claim 6, wherein the first magnet and the second magnet are molded and encapsulated simultaneously.

8. The method of claim 7, wherein the overmolded magnet arrangement has a cylindrical shape.

9. The method of claim 5, wherein the overmolded magnet arrangement has a cylindrical shape.

10. The method of claim 9 wherein the overmolded magnet arrangement includes a central window that is circular in shape to define an aperture extending from a flat end into the overmolded magnet arrangement.

11. The method of claim 6, wherein encapsulating the overmolded magnet arrangement into an end of the rotary arm member includes the molding of the overmolded magnet arrangement to protect the overmolded magnet arrangement from exposure to a hostile exterior vehicle environment of moisture, salt, dirt, physical damage, and extreme temperatures, and wherein the resin is polybutylene terephthalate (PBT).

12. The method of claim 6, wherein the first and second magnets are spaced rectangular shaped magnets.

13. A vehicle chassis sensor assembly for measuring the ride height of a vehicle and comprising a rotary arm member including an overmolded magnet arrangement that includes a pair of spaced magnets encapsulated in the rotary arm member.

14. The vehicle chassis sensor assembly of claim 13 wherein the overmolded magnet arrangement includes a base mount of overmold material from resin encompassing a portion of the magnets.

15. The vehicle chassis sensor assembly of claim 14 wherein the overmolded magnet arrangement includes an enclosing mount of overmold material from resin enclosing a remaining portion of the pair of magnets so that the pair of magnets are entirely encapsulated.

16. The vehicle chassis sensor assembly of claim 13, wherein the overmolded magnet arrangement has a cylindrical shape, and the overmolded magnet arrangement includes a pair of spaced notches about a periphery thereof.

17. The vehicle chassis sensor assembly of claim 16 wherein the pair of spaced magnets have a rectangular shape, and wherein the vehicle chassis sensor assembly is free from an O-ring or seal to protect the pair of spaced magnets encapsulated in the rotary arm member.

18. The vehicle chassis sensor assembly of claim 16, wherein the pair of spaced magnets include an epoxy protective outer coating.

* * * * *

UNITED STATES PATENT AND TRADEMARK OFFICE
CERTIFICATE OF CORRECTION

PATENT NO. : 12,270,640 B2
APPLICATION NO. : 17/814074
DATED : April 8, 2025
INVENTOR(S) : Jess D. Wilson Page 1 of 1

It is certified that error appears in the above-identified patent and that said Letters Patent is hereby corrected as shown below:

In the Claims

Column 6, Claim 2, Line 34:
Insert --the-- after "wherein"

Signed and Sealed this
Seventeenth Day of June, 2025

Coke Morgan Stewart
*Acting Director of the United States Patent and Trademark Office*